United States Patent [19]

Kurashima

[11] Patent Number: 5,764,904
[45] Date of Patent: Jun. 9, 1998

[54] APPLICATION SHARING SYSTEM WITH COMMUNICATION AND APPLICATION SEPARATED FROM EACH OTHER

[75] Inventor: Akihisa Kurashima, Tokyo, Japan

[73] Assignee: NEC Corporation, Tokyo, Japan

[21] Appl. No.: 520,573

[22] Filed: Aug. 29, 1995

[30] Foreign Application Priority Data

Aug. 30, 1994 [JP] Japan ................... 6-204084

[51] Int. Cl.$^6$ .................................................. G06F 17/00
[52] U.S. Cl. .................................................. 395/200.38
[58] Field of Search ........................... 364/514 R, 514 A; 395/331, 332, 200.04, 200.38; 348/13

[56] References Cited

U.S. PATENT DOCUMENTS

| | | | |
|---|---|---|---|
| 5,245,553 | 9/1993 | Tanenbaum | 364/514 R |
| 5,392,400 | 2/1995 | Berkowitz et al. | 395/200.04 |
| 5,491,780 | 2/1996 | Fyles et al. | 395/331 |
| 5,561,811 | 10/1996 | Bier | 395/200.04 |

FOREIGN PATENT DOCUMENTS 683785  7/1992  Japan .

OTHER PUBLICATIONS

Anupam et al.; "Distributed and Collaborative Visualization"; Computer Magazine, Jul. 1994.

Ngoh et al.; "Initial experience in Implementing Multicast Facilities in Computer Supported Cooperative Work"; IEEE Conference Publication 316, 1990.

Maeno et al.; "Distributed Desktop Conferencing System (MERMAID) Based On Group Communication Architecture"; Communications, 1991 IEEE International Conference, 1991.

"Distributed Cooperative Control for Sharing applications Based on Multiparty And Multimedia Desktop Conferencing System: MERMAID"; T. Ohmori et al.; IEEE Computer Society Press Reprint; Yokohama, Japan; Jun. 9–12, 1992; pp. 538–546.

"Distributed Cooperative Control for Sharing applications Based on the MERMAID Multiparty and Multimedia Desktop Conferencing System"; Toyoko Abe et al.; NEC Research and Development; vol. 34, No. 1, pp. 122–131, Jan. 1993.

Primary Examiner—Ellis B. Ramirez
Attorney, Agent, or Firm—Whitham, Curtis & Whitham

[57] ABSTRACT

In a network comprising a plurality of terminals which share application programs, when an event occurs in an application of a terminal, the application generates a message of a predetermined format in response to the event. The message includes application identifying information, procedure identifying information and parameter information required for executing the procedure. The message is broadcasted from the terminal to all the terminals through the network. The message may be directly transferred from the transmitter to the receiver within the terminal itself. On receipt of the message, each terminal identifies the procedure based on the message, and executes the procedure on the application using the parameter information.

24 Claims, 8 Drawing Sheets

COMMUNICATION MESSAGE FORMAT

PROCEDURE CALL MESSAGE FORMAT

FIG. 5

PROCEDURE REFERENCE TABLE

| PROCEDURE NAME | PROCEDURE |
|---|---|
| LINE | DRAW LINE ( ) |
| CIRCLE | DRAW CIRCLE ( ) |
| ⋮ | ⋮ |

APPLICATION SHARING SYSTEM WITH COMMUNICATION AND APPLICATION SEPARATED FROM EACH OTHER

BACKGROUND OF THE INVENTION

1. Field of the Invention

The present invention relates to a system in which an application program is shared by a plurality of terminals and, more specifically, to an event driven system in which execution results of an application program can be shared by a plurality of terminals on a real-time basis.

2. Description of the Prior Art

The progress of communication networks has vastly changed office environments in recent years, and this trend is still going on. In particular, group cooperative work utilizing a remote conference system is expected to greatly improve the working efficiency. In the group cooperative work, it is necessary to allow respective computer terminals to share the same application program.

"To share an application" means that in a state that the same application is running on respective joining terminals an execution result and progress of the application in response to an operation performed by a certain one of the terminals can be shared by the other terminals on a real-time basis. For example, consider a case where the same document is edited by a plurality of terminals. In such a case, when a user of one terminal has corrected a certain portion of the subject document on the same document which is being edited by an application program running on every joining terminal, the same correcting operation and its result are executed on the monitors of the other terminals.

An example of such an application sharing system is disclosed in Japanese Unexamined Patent Publication No. Hei. 6-83785. FIG. 1 is a block diagram showing a general configuration of this application sharing system. In this system, terminals 11, 21 and 31 are connected to a server 40 via respective communication lines and the server 40 has a broadcast controller. The same application program AP is running on the data processor of each terminal.

Now assume that an application program $AP_1$ is running on a data processor 12 of the terminal 11 and is just supplied with event information from an event supply means 13 such as a keyboard and a pointing device. An event analyzing means 14 generates a procedure execution request message based on the event information, and sends it to a message communication means 15 and a procedure execution means 16. The message communication means 15 transmits the generated procedure execution request message to the server 40 via the communication line. The broadcast controller of the server 40 simultaneously transmits the procedure execution request message as received from the terminal 11 to the other terminals 21 and 31. Upon reception of the procedure execution request message from the server 40, each of the terminals 21 and 31 forwards the message content to the procedure execution means via the message communication means. Each procedure execution means executes the same procedure as that of the terminal 11 does.

The above type of application sharing method is used in the desktop conference system called MERMAID. As for MERMAID, refer to Watabe et al.: "Distributed Cooperative Control for Sharing Applications Based on Multiparty and Multimedia Desktop Conferencing System: MERMAID," Proceedings of the 12th International Conference on Distributed Computing Systems, Yokohama, Japan, Jun. 9–12, 1992, IEEE Computer Society; and Fukuoka et al.: "Distributed Cooperative Control for Sharing Applications Based on the MERMAID Multiparty and Multimedia Desktop Conferencing System," Vol. 34, No. 1, pp. 122–131, Jan. 1993, NEC Research and Development.

However, in the conventional application sharing system, since an application program sends a procedure execution request message directly to the server, the format of a communication message is different from one application program to another. Therefore, to share a plurality of application programs, the communication message needs to be defined for each application program. This complicates development of a sharing application program, thus making it difficult to reduce the development cost and shorten the development period.

Further, in the conventional system, the message communication means of an application program sends and receives a procedure execution request message. Therefore, in the event that message exchange is not performed properly on the application side, it is very difficult to judge whether a program of the message communication means has a bug or the remaining portion of the application program has a bug, thus necessitating substantial time for debugging.

Still further, since the message communication means of an application program sends and receives a procedure execution request message, correct operation of the application program cannot be confirmed completely without a terminal to communicate with. That is, an operation test involving only the terminal concerned cannot assure its correct operation on a network because of omission of a test of the message communication means. Therefore, it requires substantial time to confirm correct operation of an application program, which can delay quick development.

SUMMARY OF THE INVENTION

An object of the present invention is to provide a method and system for sharing applications so as to improve the development efficiency of a sharing application program.

Another object of the present invention is to provide an application sharing system which facilitates sharing of a plurality of applications by a plurality of terminals.

Still another object of the present invention is to provide an application sharing system which enables operation testing of not only an application program but also a communication function within a terminal.

According to the present invention, in a network comprising a plurality of terminals which share one or more applications, when an event occurs in a terminal, the application generates a message of a predetermined format in response to the event. The message includes application identifying information, procedure identifying information and parameter information required for executing the procedure. The message is broadcasted from the terminal to all the terminals through the network. The message may be directly transferred from the transmitter to the receiver within the terminal itself. On receipt of the message, each of the terminals identifies the procedure based on the first information and the second information of the message, and executes the procedure on the application using the third information.

Each of the terminals has an application division and a communication division, wherein the application division transfers the message of the predetermined format to the communication division.

According to the invention, the message is transferred from the application division to the communication division according to a predetermined format. Therefore, in developing an application program, it is not necessary to provide any definition on communication control for the program sharing. This improves the development efficiency of an application program. Further, since the message format does not depend on the application program, it becomes much easier to share a plurality of application programs by a plurality of terminals.

Since an application program and a communication control means are separated from each other and the application program operates through the communication division, the operation of the application program, including its communication function, can easily be checked within a single terminal. This contributes to shortening of the development period of an application program.

BRIEF DESCRIPTION OF THE DRAWINGS

FIG. 5 shows an example of contents of a procedure reference table in the first embodiment;

DETAILED DESCRIPTION OF THE PREFERRED EMBODIMENTS

Figure 1:
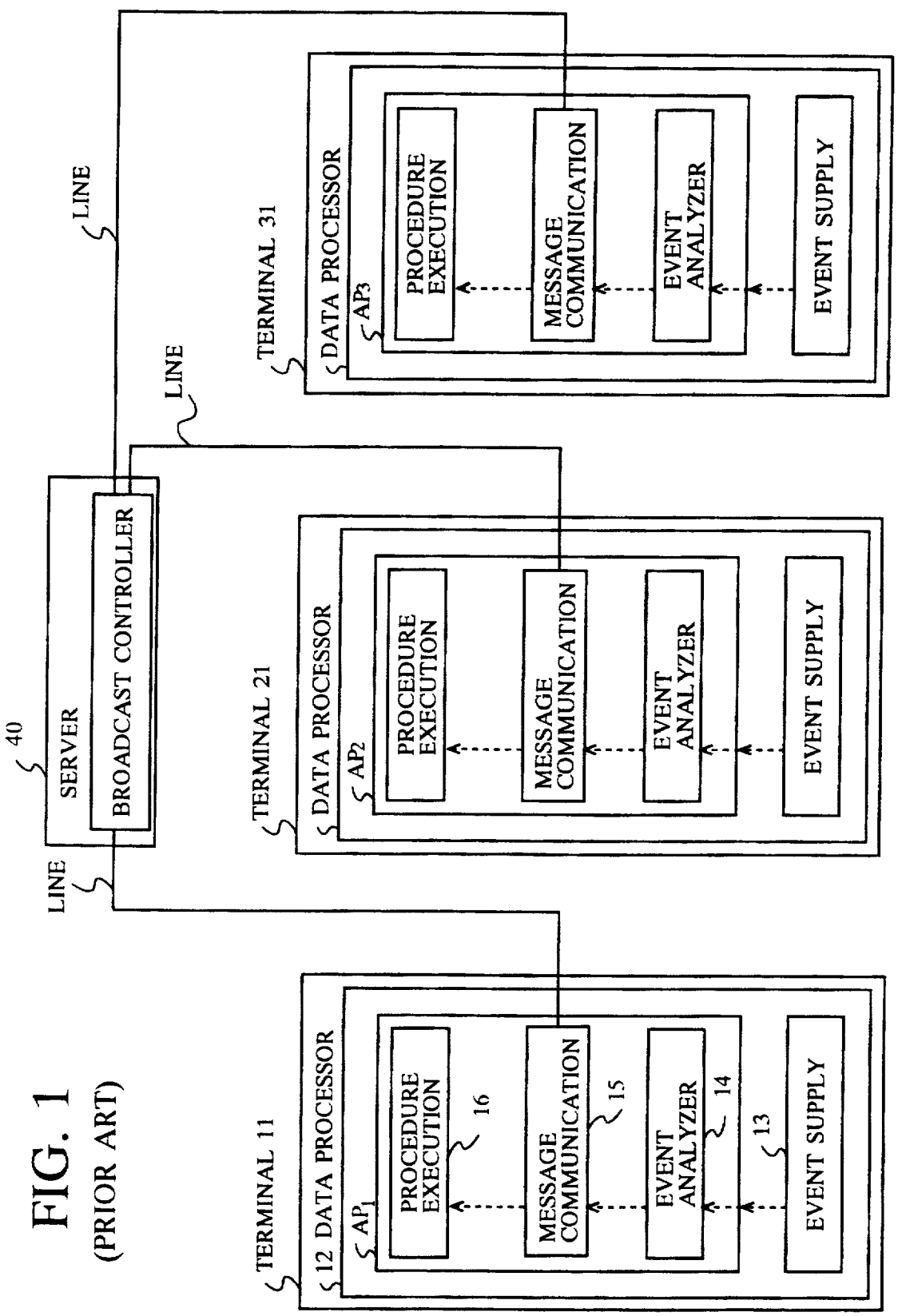
FIG. 1 is a block diagram showing a functional configuration of a conventional application sharing system.
Figure 2:
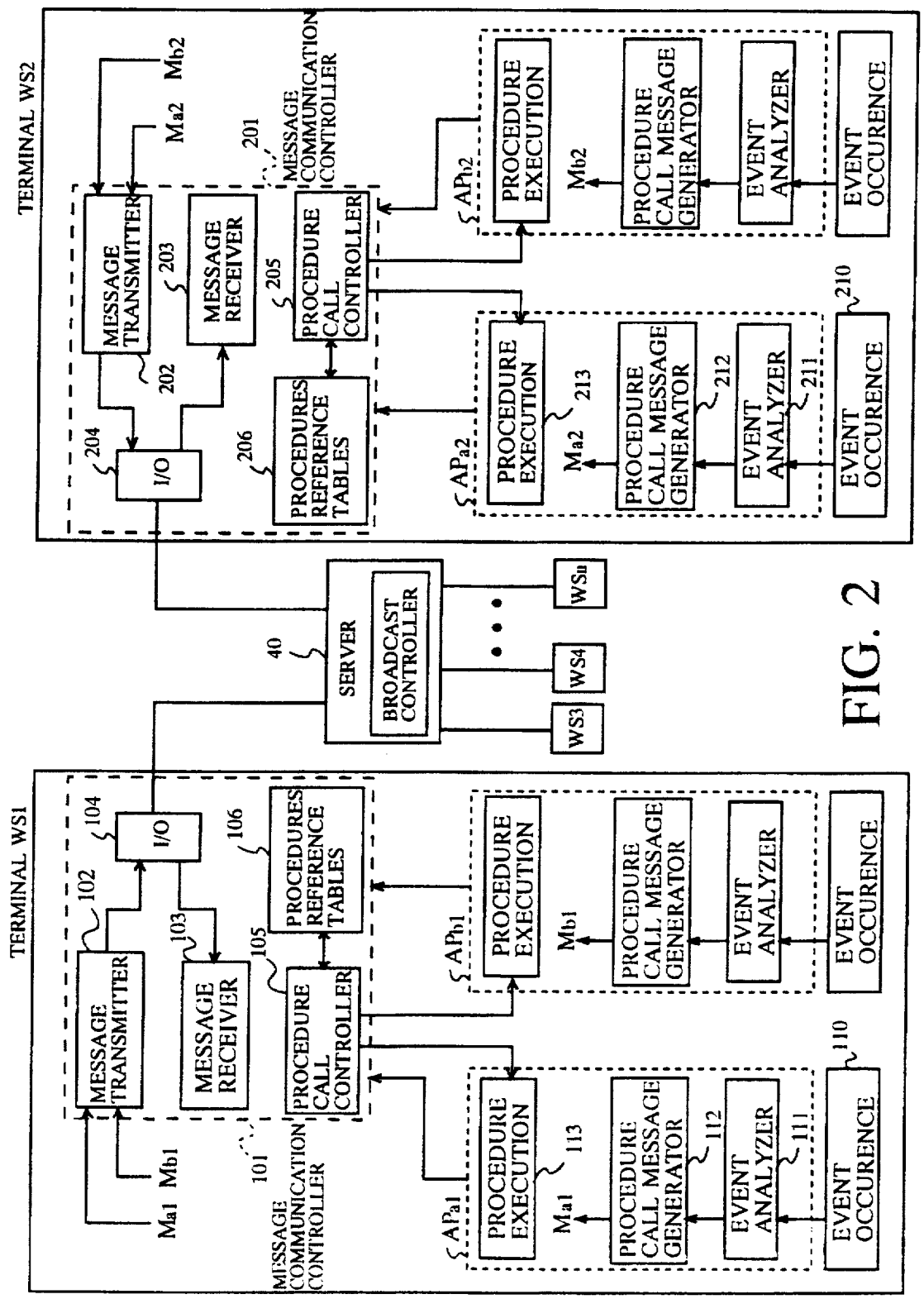
FIG. 2 is a block diagram showing the configuration of an application sharing system according to a first embodiment of the present invention.

Referring to FIG. 2, an application sharing system according to a first embodiment of the present invention comprises of a plurality of group terminals $WS_1$-$WS_n$ and a network server 40 for connecting those terminals. Having a broadcasting function, the server 40 broadcasts a message received from a certain terminal to all the group terminals. Each of the group terminals $WS_1$-$WS_n$ has a message communication controller separate from the sharing application programs AP. Although the following detailed description will be directed to the terminal $WS_1$, the same description applies to the other terminals. To simplify the description, it is assumed that two sharing application programs $AP_a$ and $AP_b$ are running on each terminal.

In the terminal $WS_1$, a message communication controller 101 comprises of a message transmitter 102, a message receiver 103, a network interface 104, a procedure call controller 105, and procedure reference tables 106. The message transmitter 102 receives messages $M_{a1}$ and $Mb_1$ of a predetermined format from the respective sharing application programs $AP_a$, and $AP_1$, and transmits those to the network server 40 via the interface 104 and a communication line. The message receiver 103 receives, via the interface 104, a message sent from the server 40. If the received message is of the same group, the message receiver 103 takes necessary information (described later) from the message and supplies it to the procedure call controller 105. The procedure call controller 105 retrieves the procedure reference tables 106 based on the received message information, calls a procedure corresponding to the message, and supplies the procedure to the application program $AP_{a1}$, or $AP_{b1}$ to which the message is directed.

When an event is generated by an input means 110 such as a keyboard or a pointing device, the application program $AP_{a1}$, or $AP_{b1}$ changes its internal state accordingly. More specifically, when an event is input, an event analyzer 111 of the application program $AP_{a1}$, analyzes the event to identify the kind of the event (for instance, a character text, a display figure, etc.), and a procedure call message generator 112 generates a message $M_{a1}$ for calling a procedure corresponding to the event. The message $M_{a1}$ is not input to a procedure executing section 113, but input to the message transmitter 102 of the message communication controller 101. Similarly, in the application program $AP_{b1}$, a message $M_{b1}$ for calling a procedure corresponding to a generated event is generated and input to the message transmitter 102. For example, when receiving a message $M_{a1}$ of the application program $AP_{a1}$ from the terminal $WS_1$, the server 40 broadcasts the same message $M_{a1}$ to all the terminals $WS_1$-$WS_n$. Upon reception of the message $M_{a1}$ from the server 40, each of the terminals $WS_1$-$WS_n$ calls a procedure corresponding to the message $M_{a1}$ from the procedure reference tables 106 and supplies it to the application program $AP_a$ designated by the message $M_{a1}$. In this manner, the procedure that is called based on the message $M_{a1}$ is executed by the application program $AP_a$ of each terminal. As a result, all the terminals $WS_1$-$WS_n$ can share, on a real-time basis, an execution result and progress of the event that occurred in the terminal $WS_1$.

Figure 3:
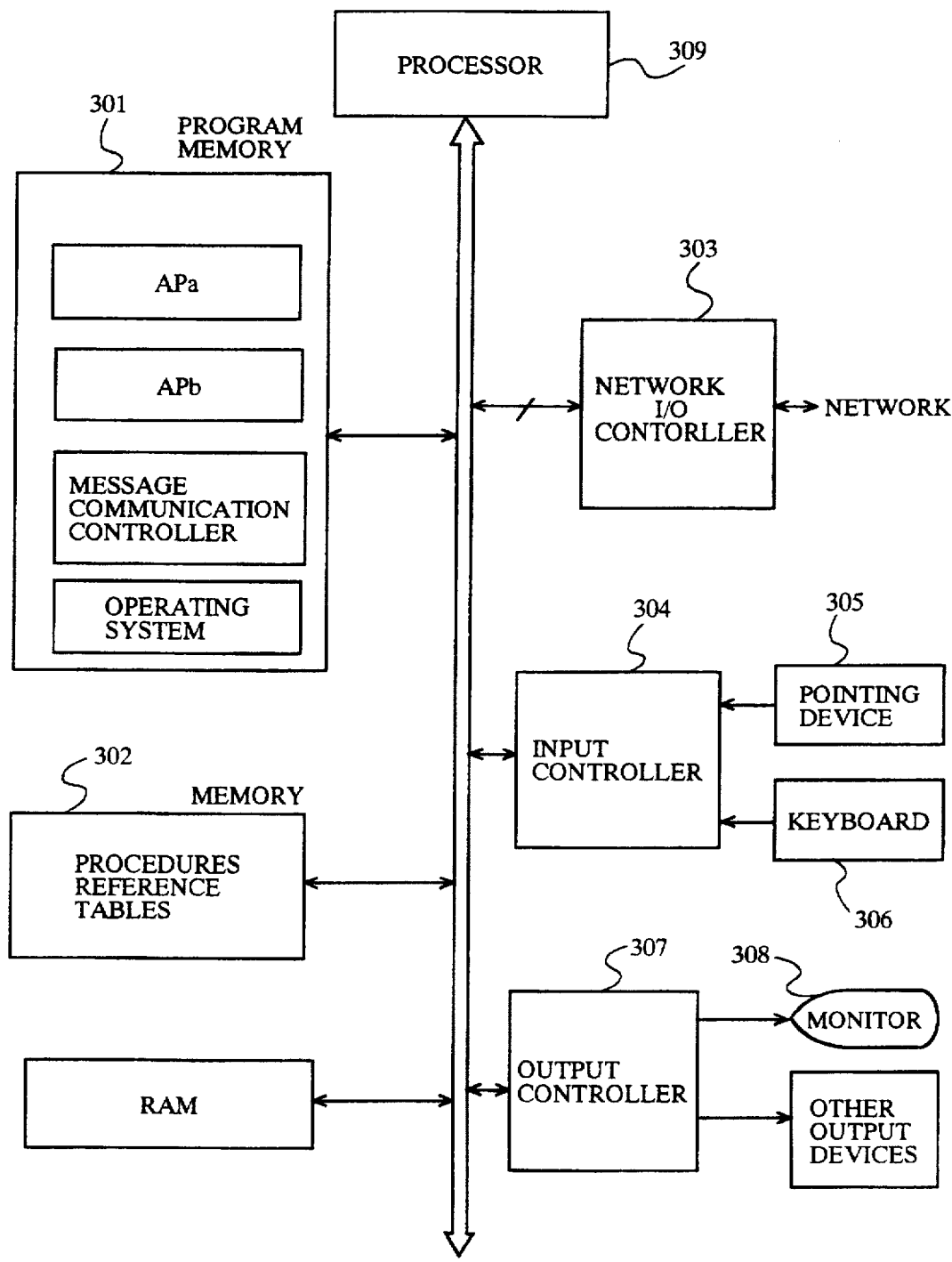
FIG. 3 is a block diagram showing a general hardware configuration of a terminal in the first embodiment.

FIG. 3 shows an example of a hardware configuration of one terminal WS. A program memory 301 stores the application programs $AP_a$ and $AP_b$, a message communication control program, an operating system, and other necessary programs. Each of the application programs $AP_a$ and $AP_b$ includes the event analyzer 111 or 211, the procedure call message generator 112 or 212, and the procedure executing section 113 or 213. The message communication control program includes the message communication controller 101 or 201 and the procedure call controller 105 or 205.

A memory 302 stores procedure reference tables each consisting of procedure names and procedure execution contents (see FIG. 5). When an application program is activated in each terminal, the application program transfers a procedure reference table to the message communication control program, which then stores the received table into the memory 302. In this example, two tables corresponding to the respective application programs $AP_a$ and $AP_b$ are stored in the memory 302.

Each terminal is connected to the network provided by the server 40 via a network I/O controller 303. An input means for generating an event is composed of an input controller 304, a pointing device 305, and a keyboard 306. Examples of the pointing device 305 are a mouse, a tablet, and a pen. An output means of each terminal is composed of an output controller 307, a monitor 308, and an output device such as a printer. These devices are connected to a processor 309 via a bus.

The processor 309 constructs the above-described application sharing system by activating the operating system, the message communication control program, and the application programs, all of which are stored in the program memory 301. Event information (for instance, a character text input) supplied from the keyboard 306 is converted to a message $M_a$ by the event analyzer 111 and the procedure call message generator 112 of the application program (for instance $AP_a$), and the message $M_a$ is transmitted by the message transmitter 102 of the message communication control program to the network via the network I/O controller 303.

When receiving, via the network I/O controller 303, the message $M_a$ that has been broadcast from the network server 40, the procedure call controller 105 of the message communication control program identifies the application program $AP_a$ that is related to the message $M_a/$ and calls a procedure designated by the message $M_a$ from the procedure reference table of the application program $AP_a$ by searching the memory 302. The called procedure and associated data are input to the application program $AP_a$ and the procedure is executed thereby. An execution result of this procedure is displayed on the monitor 308 via the output controller 307. Therefore, the same execution result is displayed on a real-time basis on the monitor 308 of the terminal where the event occurred and the monitors 308 of the other terminals.

Message Format

The procedure call message generators (e.g. 112, 212) of the application programs $AP_a$ and $AP_b$ supply messages $M_a$ and $M_b$ of a predetermined format to the message transmitter (e.g. 102, 202), respectively. The format of the messages $M_a$ and $M_b$ is predetermined independently of the application program $AP_a$ or $AP_b$. In other words, the procedure call message generator (112, 212) of each application program $AP_a$ or $AP_b$ is so designed as to generate a message $M_a$ or $M_b$ of such a predetermined format. A message $M_a$ or $M_b$ generated by the procedure call message generator has information that is necessary for the sharing of the application program $AP_a$ or $AP_b$, and comprises of a communication message and a procedure call message.

As shown in FIG. 41, the communication message comprises a group identifier 401 and an application program identifier 402. The group identifier 401 is used to identify a working group that the terminal concerned joins, and designates a message-directed terminal group to which the message should be transmitted. The application program identifier 402 is used to identify an application program that should receive the message in the message-directed terminal.

Figure 4A:
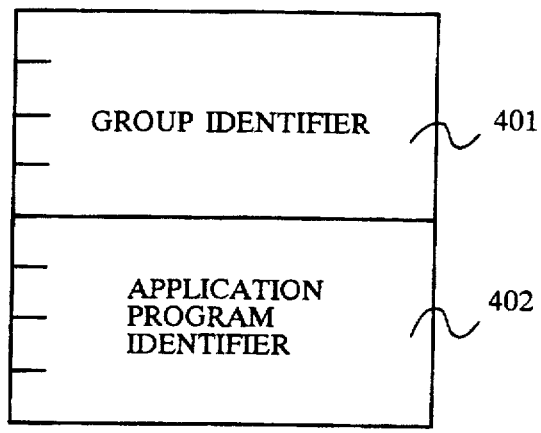
FIG. 4A shows a format of a communication message in the first embodiment.
Figure 4B:
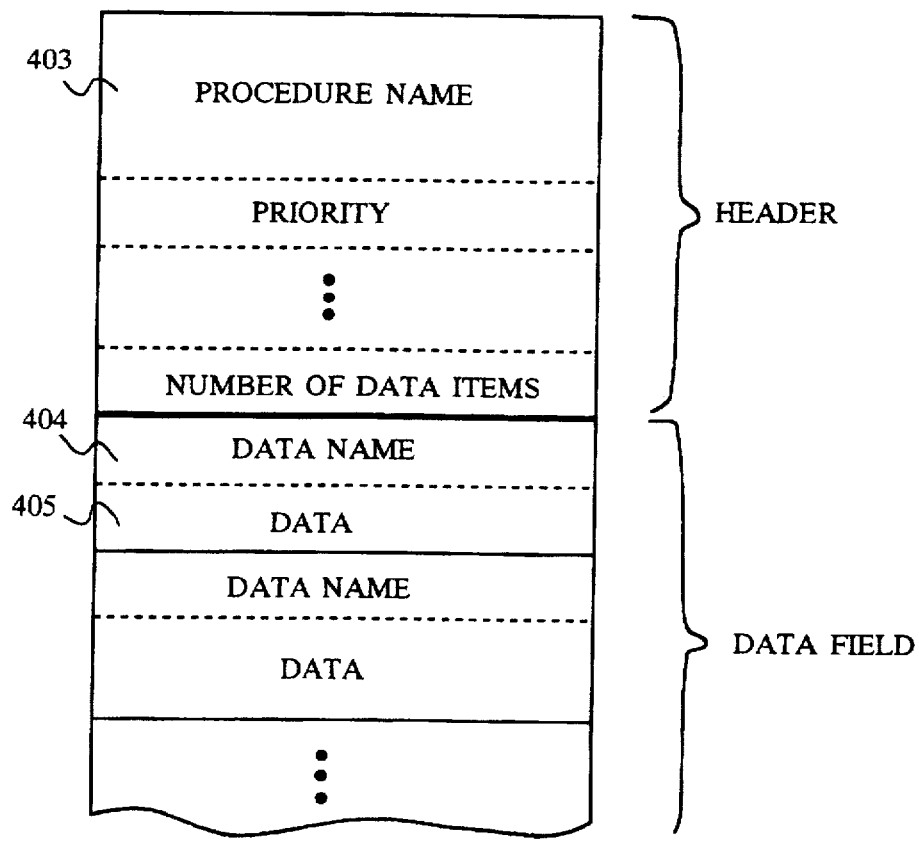
FIG. 4B shows a format of a procedure call message in the first embodiment.

Referring to FIG. 4B, the procedure call message is comprises of a header and a data field. The header consists of a procedure name 403, a priority rank, the number of data items, and other information. The data field includes a plurality of data items each consisting of a data name 404 and data 405. For example, in the case of a procedure of straight line drawing, the procedure name 403 of the header is "line." The data name 404 of the first data item is "start point coordinate" and the corresponding data 405 is coordinate values (a, b). The data name 404 of the second data item is "end point coordinate" and the corresponding data 405 is (c, d).

It should be noted that the formats shown in FIGS. 4A and 4B are examples. The invention simply requires that predetermined formats be used. Formats may be used that are suitable for an actual communication system.

Procedure Reference Table

FIG. 5 shows an example of the procedure reference table. There are stored a straight line drawing procedure "DrawLine ( )" for a procedure name 403 "line," and a circle drawing procedure "DrawCircle ( )" for a procedure name 403 "circle."

When one application program is activated, one procedure reference table corresponding to the application program is registered in the memory 302. As described above, when the message receiver 103 receives a message, the procedure call controller 105 searches the procedure reference tables 106 and calls a procedure (or a function, a subroutine, or the like) that coincides with the procedure name 403 of the header of the message. The called procedure and data necessary for its execution are supplied to an application program identified by the application program identifier 402 of the communication message and the called procedure is executed using the data of the data field.

Processing Flow of Terminal

Figure 6:
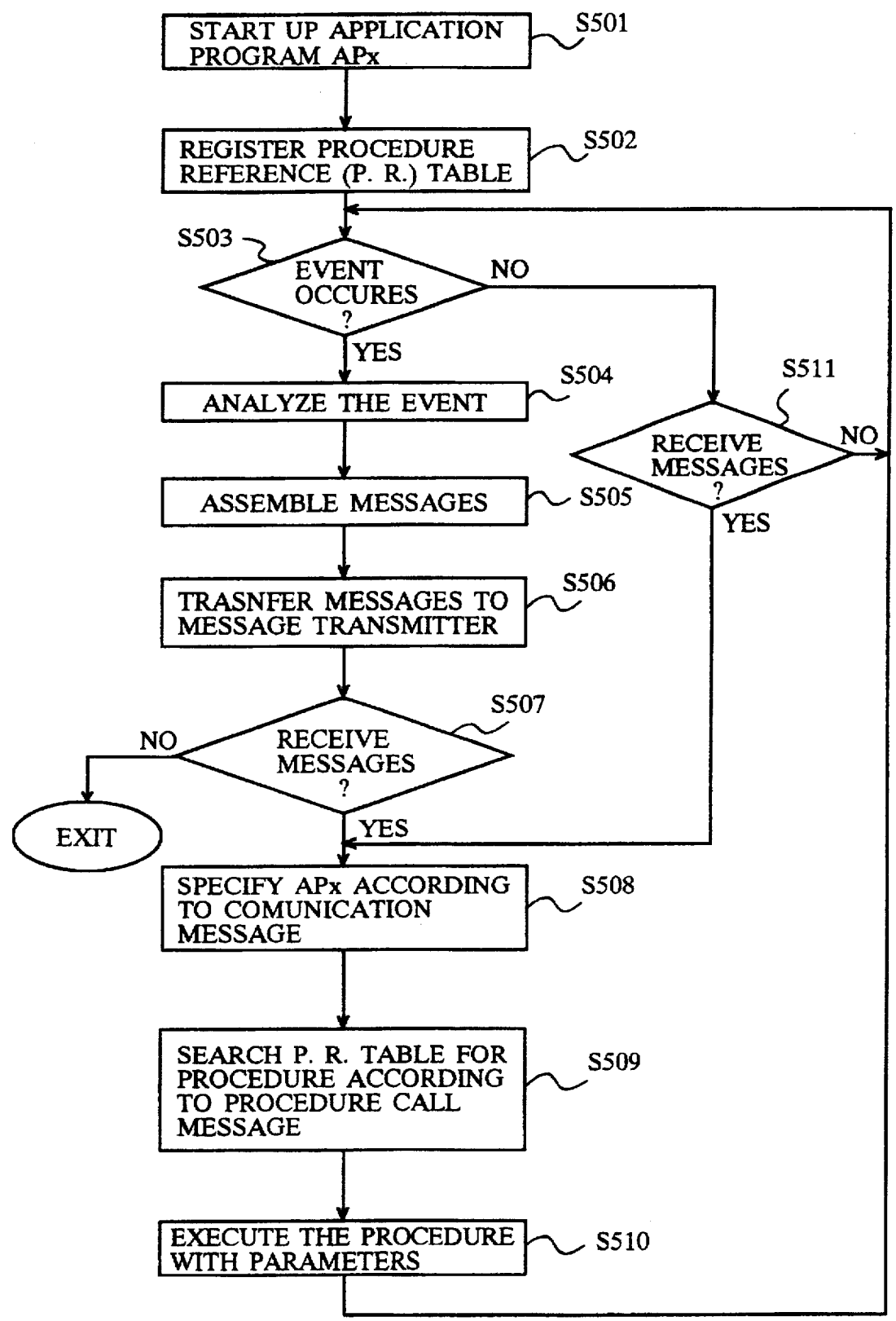
FIG. 6 is a flowchart showing a control procedure of a terminal in the first embodiment.

Referring to FIG. 6, when an application program $AP_a$ is activated in, for instance, the terminal $WS_1$ (S501), a corresponding procedure reference table 106 comprising necessary procedure names and procedures is registered in the memory 302 (S502).

When an event occurs in this state (Yes in S503), the event analyzer 111 of the application program $AP_x$ analyzes the event and identifies the kind of the event and necessary data (S504). For example, in the case of a drawing program, the event analyzer 111 analyzes a mouse movement, and determines the kind of figure to be displayed and data necessary for displaying that figure.

Subsequently, the procedure call message generator 112 receives the kind of event and the data from the event analyzer 111, assembles a communication message and a procedure call message according to the respective formats shown in FIGS. 4A and 4B (S505), and transfers those to the message transmitter 102 of the message communication controller 101. (S506). As described above, the message transmitter 102 transmits the received message to the server 40, which broadcasts it to all the joining terminals in accordance with a group identifier 401 of the communication message. As described later, the message transmitter 102 may directly transmit the message to the group terminals in accordance with the group identifier 401.

When receiving a message transmitted from its own terminal or a message transmitted from some other group terminal (Yes, in S507 or S511), the procedure call controller 105 identifies an application program $AP_a$ based on an application program identifier 402 of the received communication message (S508), and calls a necessary procedure by searching the procedure reference table 106 using a procedure name 403 of the procedure call message as a keyword (S509). The called procedure is executed while data 405 is input by using a data name 404 of the procedure call message as a key (S510).

In the above manner, an application program can be shared on a real-time basis by generating and broadcasting a communication message and a procedure call message according to predetermined formats as those shown in FIGS. 4A and 4B.

SECOND EMBODIMENT

Figure 7:
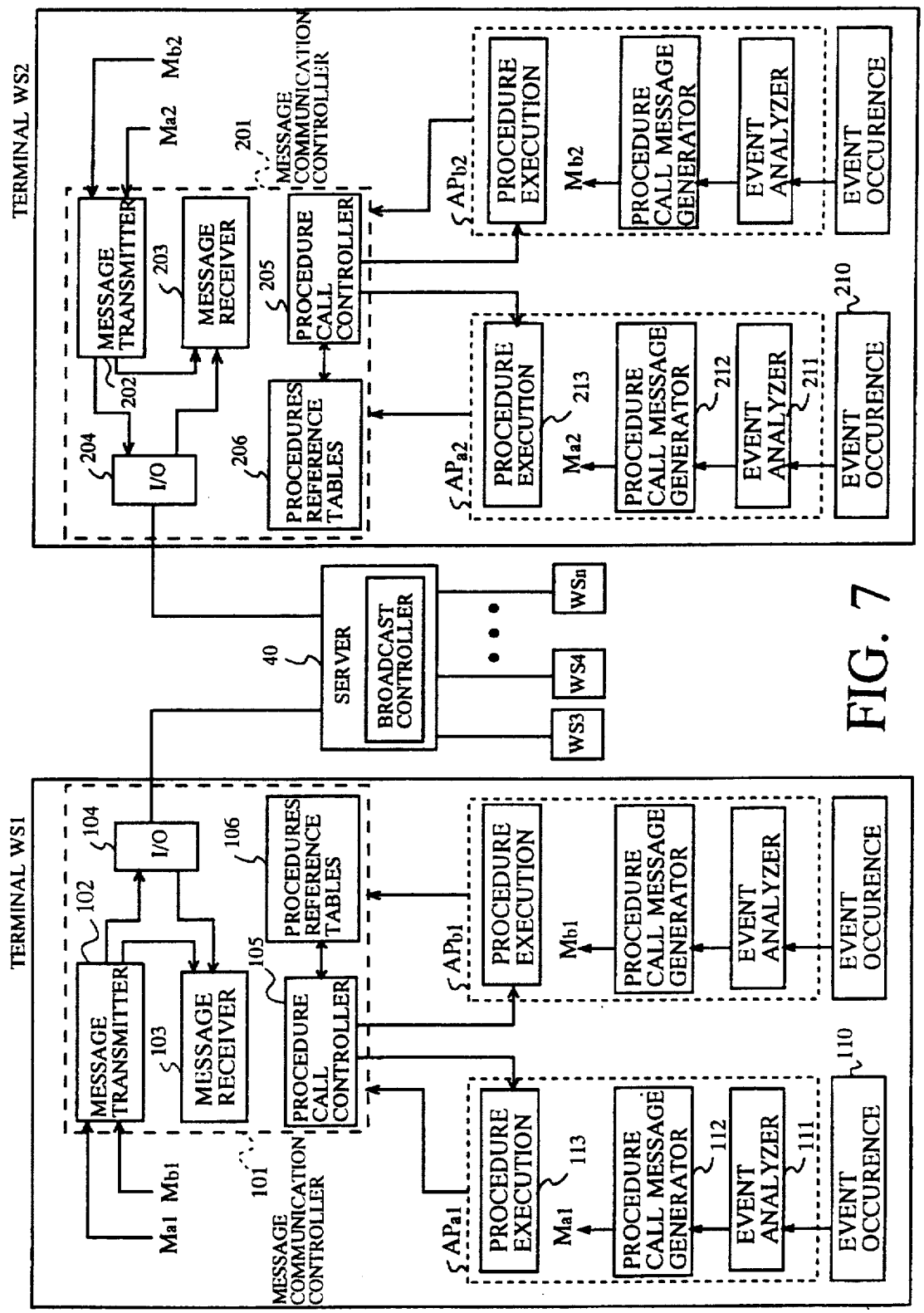
FIG. 7 is a block diagram showing the functional configuration of an application sharing system according to a second embodiment of the invention.

Referring to FIG. 7, as in the case of the first embodiment, an application sharing system according to a second embodiment of the invention is comprises of a plurality of terminals $WS_1-WS_n$ and a network server 40 connecting those. The server 40 has a broadcasting function. The second embodiment is different from the first embodiment in that each terminal transfers a message within itself and that the server 40 broadcasts a message that is received from a certain terminal to the remaining group terminals. More specifically, in a terminal $WS_1$, when receiving a message $M_{a1}$ from an application program $AP_a$, a message transmitter 102 directly sends it to a message receiver 103 as well as to transmits it to the server 40 via an I/O interface 104. The server 40 broadcasts a communication message and a procedure call message to the remaining group terminals in accordance with a group identifier 401 of the communication message.

When the message receiver 103 receives the message that is sent from the message transmitter 102, a procedure call controller 105 identifies the application program $AP_a$, based on an application program identifier 402 of the communication message, and calls a necessary procedure by searching a procedure reference table 106 using a procedure name 403 of the procedure call message as a keyword. The called procedure is executed while data 405 is input by using a data name 404 of the procedure call message as a key.

Similarly, when a terminal $WS_2$ receives, from the server 40, a message that is originally transmitted from the terminal $WS_1$, a procedure call controller 205 identifies an application program $AP_{a2}$ based on an application program identifier 402 of a communication message, and calls a necessary procedure by searching a procedure reference table 206 using a procedure name 403 of a procedure call message as a keyword. The called procedure is executed while data 405 is input by using a data name 404 of the procedure call message as a key. In this manner, an application program can be shared by all the terminals of the same group on a real-time basis by generating and broadcasting a communication message and a procedure call message according to predetermined formats as those shown in FIGS. 4A and 4B. For the above operation, reference is made to the flowchart of FIG. 6.

This embodiment is advantageous in that operation testing of not only an application program but also its communication function can be performed within a terminal itself, because a message for procedure calling is transmitted and received within a single terminal. This is due to the fact that for an application program to correctly process an event, the message communication controller 101 needs to correctly transmit and receive a message.

THIRD EMBODIMENT

Figure 8:
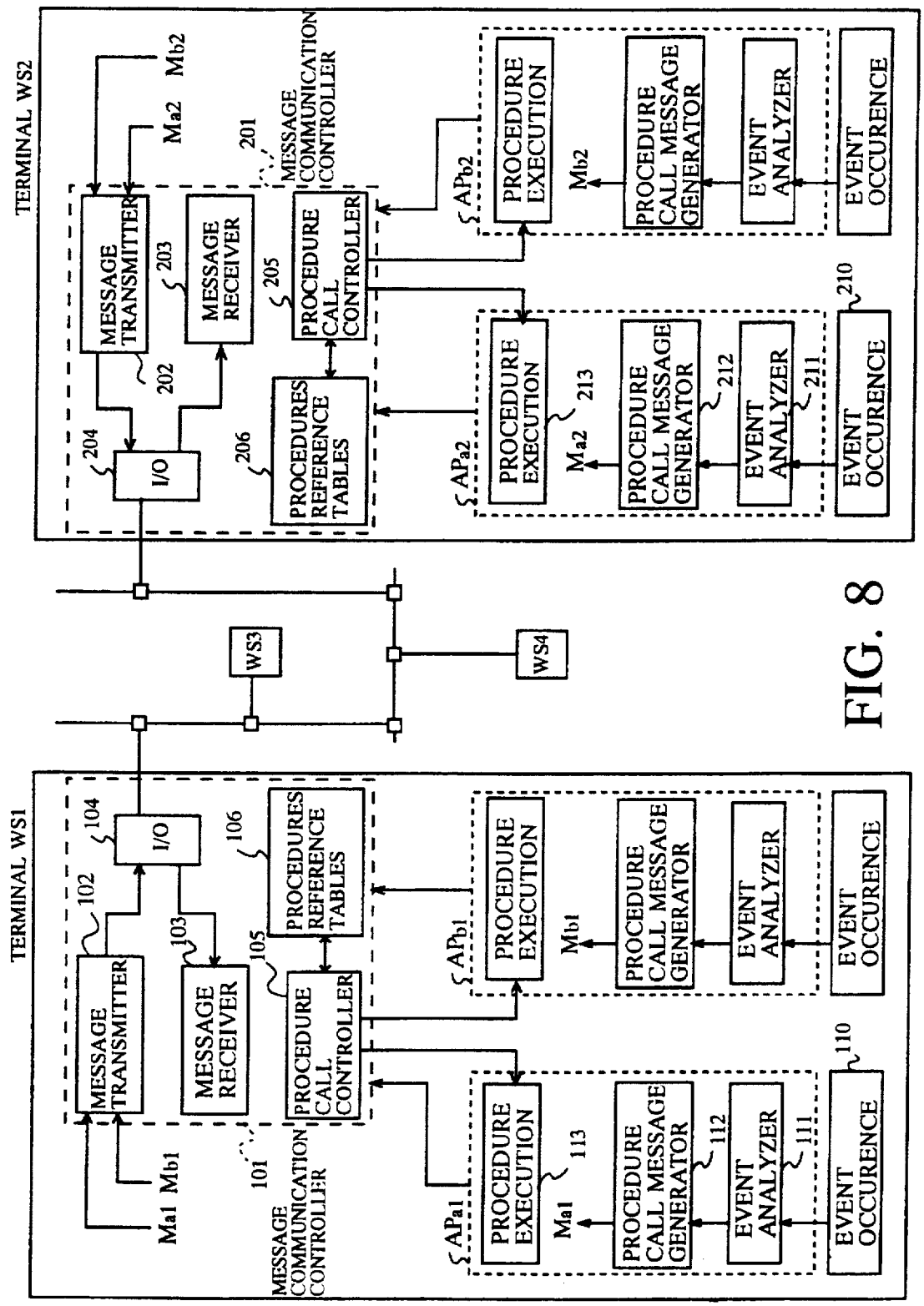
FIG. 8 is a block diagram showing the functional configuration of an application sharing system according to a third embodiment of the invention.

Referring to FIG. 8, in an application sharing system according to a third embodiment of the invention, unlike the first and second embodiments, a plurality of terminals $WS_1-WS_n$ are network-connected without using a server. In this embodiment, in, for instance, a terminal $WS_1$, when receiving a message $M_{a1}$ from an application program $AP_a$, a message transmitter 102 transmits it to the network. The message is received by not only the other group terminals but also the terminal that has transmitted the message. That is, in this embodiment, when a message for procedure calling is transmitted to the network, it is received by the same terminal at the same time. Therefore, as in the second embodiment, this embodiment is advantageous in that operation testing of not only an application program but also its communication function can be performed within a terminal itself, because a message for procedure calling is transmitted and received within a single terminal. This is due to the fact that for an application program to correctly process an event, a message communication controller 101 needs to correctly transmit and receive a message.

What is claimed is:

1. A method for sharing an application in a system comprising a plurality of terminals which are connected with each other through a network, the application running on each of the terminals, the method comprising the steps of:

at a first terminal of the terminals, a) detecting an event;

b) generating a message of a predetermined format in response to the event, the message comprising a first information, a second information and a third information, the first information identifying the application, the second information identifying a procedure which corresponds to the event, and the third information comprising a parameter information corresponding to the procedure identified by the second information required for executing the procedure;

c) sending the message to) the network; and at each of the terminals, d) receiving the message from the network;

e) identifying the procedure based on the first information and the second information of the message; and f) executing he procedure on the application using the third information.

2. The method according to claim 1, wherein each of the terminals has an application division and a communication division, the application division performing the steps (a),(b) and (f), and the communication division performing the steps (c), (d) and (e).

3. The method according to claim 1, wherein the network includes at least one server which transfers the message from the first terminal to the terminals.

4. The method according to claim 1, wherein the step (e) comprises:

reading the first information and the second information from the message;

searching a table for the procedure using the first information and the second information, the table storing in advance a plurality of procedures required in the application; and transferring the procedure and the third information to the application.

5. A method for sharing an application in a system comprising a plurality of terminals which are connected with each other through a network, the application running on each of the terminals, the method comprising the steps of:

at first terminal of the terminals, a) detecting an event;

b) generating a message of a predetermined format in response to the detected event, the message comprising a first information, a second information and a third information, the first information identifying the application, the second information identifying a procedure which corresponds to the event, and the third information comprising a parameter information corresponding to the procedure identified by the second information required for executing the procedure;

c) sending the message to terminals other than the first terminal; and at each of the terminals other than the first terminal, d) directly receiving the message through a network path without intervention of a network server;

e) identifying the procedure based on the first information and the second information of the message; and f) executing the procedure on the application using the third information.

6. The method according to claim 5, wherein each the terminal has an application division and a communication division, the application division performing the steps (a),(b) and (g), and the communication division performing the steps (c), (d), (e) and (f).

7. The method according to claim 5, wherein the network includes at least one server which transfers the message from the first terminal to each the terminal other than the first terminal.

8. The method according to claim 5, wherein the step (f) comprises:

reading the first information and the second information from the message;

searching a table for the procedure using the first information and the second information, the table storing in advance a plurality of procedures required in the application; and transferring the procedure and the third information to the application.

9. A method for sharing a plurality of applications in a system comprising a plurality of terminals which are connected with each other through a network, the applications running on each of the terminals, the method comprising the steps of:

at a first terminal of the terminals,
a) detecting an event;
b) generating a message of a predetermined format in response to the detected event, the message comprising a first information, a second information and a third information, the first information identifying an application of the applications, the second information identifying a procedure which corresponds to the event, and the third information comprising a parameter information corresponding to the procedure identified by the second information required for executing the procedure;
c) sending the message to the network; at each of the terminals,
d) receiving the message from the network;
e) identifying the procedure of the application based on the first information and the second information of the message; and
f) executing the procedure on the application using the third information.

10. The method according to claim 9, wherein each the terminal has an application division and a communication division, the application division performing the steps (a),(b) and (f), and the communication division performing the steps (c), (d) and (e).

11. The method according to claim 9, wherein the network includes at least one server which transfers the message from the first terminal to the terminals.

12. The method according to claim 9, wherein the step (e) comprises:

reading the first information and the second information from the message;

searching a table for the procedure using the first information and the second information, the table storing in advance a plurality of procedures required in the application; and transferring the procedure and the third information to the application.

13. A method for sharing a plurality of applications in a system comprising a plurality of terminals which are connected with teach other through a network, the applications running on each of the terminals, the method comprising the steps of:

at a first terminal of the terminals,
a) detecting an event;
b) generating a message of a predetermined format in response to the detected event, the message comprising a first information, a second information and a third information, the first information identifying an application of the applications, the second information identifying a procedure which corresponds to the event, and the third information comprising a parameter information corresponding to the procedure identified by the second information required for executing the procedure;
c) sending the message to terminals other than the first terminal and to a receiver of the first terminal;
d) directly receiving the message at the first terminal receiver without intervention of the network; at each of the terminals other than the first terminal;
e) receiving the message from the network; at each of the terminals,
f) identifying the procedure of the application based on the first information and the second information of the message; and
g) executing the procedure on the application using the third information.

14. The method according to claim 13, wherein each of the terminals has an application division and a communication division, the application division performing the steps (a),(b) and (g), and the communication division performing the steps (c), (d), (e) and (f).

15. The method according to claim 13, wherein the network includes at least one server which transfers the message from the first terminal to each of the terminals other than the first terminal.

16. The method according to claim 13, wherein the step (f) comprises:

reading the first information and the second information from the message;

searching a table for the procedure of the application using the first information and the second information, the table storing in advance a plurality of procedures required in the application; and transferring the procedure and the third information to the application.

17. A system for sharing an application in a network the network comprising a plurality of terminals which are connected with each other, each of the terminals comprising an application subsystem and a communication subsystem, the application subsystem comprising:
event detection means for detecting an event;
message generating means for generating a first message of a predetermined format in response to the event, the first message comprising a first information, a second information and a third information, the first information identifying the application, the second information identifying a first procedure which corresponds to the event, and the third information comprising a parameter information corresponding to the first procedure identified by the second information required for executing the first procedure; and the communication subsystem comprising:
transmitting means for transmitting the first message to the network;
receiving means for receiving a second message of the predetermined format from the network;
identifying means for identifying the second procedure based on the first information and the second information of the second message; and
transferring means for transferring the second procedure and the third information to the procedure executing means of the application.

18. The system according to claim 17, wherein the network includes at least one server which broadcasts a message of the predetermined format to the terminals.

19. The system according to claim 17, wherein the identifying means of the communication subsystem comprises:

storage means for storing a plurality of procedures required in the application;

means for reading the first information and the second information from the second message; and means for searching the storage means for the second procedure using the first information and the second information of the second message.

20. The system according to claim 17, wherein the communication subsystem further comprises:

means for directly transferring the first message from the transmitting means to the receiving means.

21. A system for sharing an application in a network the network comprising a plurality of terminals which are connected with each other, each of the terminals comprising an application subsystem and a communication subsystem, the application subsystem comprising;

means for storing the applications:

event detection means for detecting an event;

message generating means for generating a first message of a predetermined format in response to the event, the first message comprising a first information, a second information and a third information, the first information identifying the application, the second information identifying a first procedure which corresponds to the event, and the third information comprising a parameter information corresponding to the first procedure identified by the second information required for executing the first procedure; and procedure executing means for executing a second procedure received from the communication the communication subsystem comprising:

transmitting means for transmitting the first message to the network;

receiving means for receiving a second message of the predetermined format from the network;

identifying means for identifying the second procedure based on the first information and the second information of the second message; and transferring means for transferring the second procedure and the third information to the procedure executing means of the application subsystem.

22. The system according to claim 21, wherein the network includes by at least one server which broadcasts a message of the predetermined format to the terminals.

23. The system according to claim 21, wherein the identifying means of the communication subsystem comprises:

storage means for storing a plurality of procedures required in the application;

means for reading the first information and the second information from the second message; and means for searching the storage means for the second procedure using the first information and the second information of the second message.

24. The system according to claim 21, wherein the communication subsystem further comprises:

means for directly transferring the first message from the transmitting means to the receiving means.

\* \* \* \* \*